(12) United States Patent
Elliott et al.

(10) Patent No.: US 12,077,120 B2
(45) Date of Patent: Sep. 3, 2024

(54) VEHICLE ANTI-ROLLOVER DEVICE AND METHOD

(71) Applicants: Taylor Elliott, Bakersfield, CA (US); Marcus Ramey, Bakersfield, CA (US); Victoria Ramey, Bakersfield, CA (US); Audrey Ramey, Bakersfield, CA (US)

(72) Inventors: Taylor Elliott, Bakersfield, CA (US); Marcus Ramey, Bakersfield, CA (US); Victoria Ramey, Bakersfield, CA (US); Audrey Ramey, Bakersfield, CA (US)

( * ) Notice: Subject to any disclaimer, the term of this patent is extended or adjusted under 35 U.S.C. 154(b) by 0 days.

(21) Appl. No.: 17/876,563

(22) Filed: Jul. 29, 2022

(65) Prior Publication Data
US 2023/0249638 A1 Aug. 10, 2023

Related U.S. Application Data

(63) Continuation of application No. 17/666,568, filed on Feb. 8, 2022, now abandoned.

(51) Int. Cl.
| | |
|---|---|
| *B60R 21/13* | (2006.01) |
| *B60R 21/013* | (2006.01) |
| *B60R 21/0132* | (2006.01) |
| *B60R 21/00* | (2006.01) |

(52) U.S. Cl.
CPC .......... *B60R 21/13* (2013.01); *B60R 21/0132* (2013.01); *B60R 2021/0018* (2013.01); *B60R 2021/01306* (2013.01)

(58) Field of Classification Search
CPC ............ B60R 2021/0018; B60R 21/13; B60R 2021/01306; B60R 19/40; B60R 19/42
See application file for complete search history.

(56) References Cited

U.S. PATENT DOCUMENTS

| | | | | |
|---|---|---|---|---|
| 1,231,531 A | * | 6/1917 | Shilling | B60R 21/00 280/755 |
| 1,932,031 A | * | 10/1933 | Bellantese | B60R 21/00 280/755 |
| 5,931,499 A | * | 8/1999 | Sutherland | B60R 21/00 280/755 |
| 6,394,738 B1 | * | 5/2002 | Springer | B62D 49/08 414/673 |
| 6,588,799 B1 | * | 7/2003 | Sanchez | B62D 37/00 280/755 |

(Continued)

FOREIGN PATENT DOCUMENTS

CN 101885320 A 11/2010

OTHER PUBLICATIONS

English machine translation for CN101885320A downloaded from "https://worldwide.espacenet.com/patent/search/family/043071464/publication/CN101885320A?q=pn%3DCN101885320A" Aug. 1, 2022.

*Primary Examiner* — Amy R Weisberg
*Assistant Examiner* — Matthew Joseph Ganci
(74) *Attorney, Agent, or Firm* — Sierra IP Law, PC; William K. Nelson (57) ABSTRACT

An anti-rollover system and method for mitigating vehicle rollover. The system having a plurality of anti-rollover devices positioned around the vehicle chassis and being operable to calculate the likelihood of a vehicle rollover and determine the attitude of rollover there by actuating the anti-rollover device to counter roll thereby preventing a rollover collision.

16 Claims, 5 Drawing Sheets

(56) References Cited

U.S. PATENT DOCUMENTS

| | | | |
|---|---|---|---|
| 6,725,135 B2* | 4/2004 | McKeown | B60R 16/0233 |
| | | | 701/72 |
| 7,654,569 B2 | 2/2010 | Nelson | |
| 7,673,902 B2* | 3/2010 | Jayasuriya | B60R 21/00 |
| | | | 280/755 |
| 7,997,616 B1 | 8/2011 | Beki | |
| 8,935,048 B2 | 1/2015 | Sun | |
| 10,086,787 B1 | 10/2018 | Akhlaque-e-rasul et al. | |
| 2003/0088349 A1* | 5/2003 | Schubert | B60R 21/013 |
| | | | 701/1 |
| 2003/0130778 A1* | 7/2003 | Hrovat | B60T 8/172 |
| | | | 180/282 |
| 2005/0230176 A1 | 10/2005 | Wang | |
| 2008/0122209 A1 | 5/2008 | Jayasuriya | |
| 2009/0164060 A1* | 6/2009 | Fortson | B60R 21/0132 |
| | | | 701/33.4 |
| 2011/0204609 A1* | 8/2011 | Gad Elkariem | B62D 49/08 |
| | | | 280/755 |
| 2015/0102591 A1 | 12/2015 | Sagas | |
| 2016/0214557 A1* | 7/2016 | Villa | B62D 49/08 |
| 2020/0148150 A1 | 5/2020 | Rodriguez | |
| 2021/0122188 A1 | 4/2021 | Morimoto et al. | |

* cited by examiner

VEHICLE ANTI-ROLLOVER DEVICE AND METHOD

FIELD OF THE INVENTION

The present invention generally relates to a system and method for mitigating vehicle rollover and tipping over, more particularly an anti-rollover system operable to determine the attitude of a vehicle rollover and mitigating rollover risk by deploying one of a plurality of anti-rollover devices secured to the undercarriage of a vehicle chassis to counter the attitude of vehicle roll.

DISCUSSION OF THE BACKGROUND

Motor vehicle rollover occurs under two conditions and is characterized by two types of rollovers, tripped rollover and untripped rollover. Tripped rollover is simple, an external object such as a curb or a collision with a vehicle destabilizes the vehicle causing the vehicle to roll over. Untripped rollover is more complicated and occurs when a vehicle's lateral force or inertial force and tire forces overcome the force of gravity about the center of gravity, causing the vehicle to turn over. An untripped rollover occurs mainly in vehicles with a high center of gravity, such as sport utility vehicles, semi-trucks, and narrow wheel tracks. Rollover does not simply mean a vehicle rolls onto its side. Rollover may include a combination of yaw, pitch, and roll, where the vehicle may be subject to rotation in three degrees of freedom. Systems designed to counter roll are optimized to counter roll in a particular direction, typically tailored for vehicles having a high center of gravity. There is no solution for vehicles with a substantially low center of gravity or for countering rollover in various directions. Thus, there is a need for a device and system that is operable to determine the direction of a vehicle's rollover and counter the direction of rotation to mitigate vehicle rollover.

SUMMARY OF THE INVENTION

The present invention provides an anti-rollover system and method for determining a motor vehicle's rollover potential. The anti-rollover system includes a plurality of independent anti-rollover devices (ARDs) attached to a vehicle chassis. The anti-rollover system is operable to actuate an ARD that is most likely to mitigate rollover and stabilize a vehicle. The motor vehicle includes a chassis with a front, rear, right, and left sides hereinafter referred to as "front," "rear," "left," and "right," and includes a bottom surface "under carriage" that is operable to secure an ARD positioned at the corners of a motor vehicle, for example, a pair of independent right side ARDs and a pair of independent left side ARDs each having an ARD positioned at the front and the rear. In some embodiments, the ARD may be integrated into the vehicle chassis. The side that of the vehicle that first faces the ground during a roll sequence is the "leading side," and a rollover may be characterized as, e.g., a "driver-side leading rollover", "driver side down rollover", or "passenger-side leading rollover".

In an exemplary embodiment, the anti-rollover system may include a controller having a processor and a readable and writeable storage medium. The controller may be in communication with a vehicle computer, a gyroscopic sensor, a partial integral differential (e.g., PID) controller, and with each of the independent ARDs. The controller processor may be operable to determine when a vehicle rollover will occur, the rollover direction, the rollover speed, and which ARD to deploy for countering vehicle rotation. The controller may include vehicle data such as a vehicle velocity, an accelerator pedal position, a brake pedal position, a steering wheel position, and the wheel angle positions of the front steerable wheels. The system memory may include a vehicle's center of gravity, a wheel track width, a tire's air pressure, a tire's replacement life, a vehicle air drag coefficient, and the kinematic properties of the suspension of the vehicle. The gyroscopic sensors data may include the roll, pitch, and yaw of the vehicle with respect to the center of gravity. The controller may be in communication with a locking mechanism of each of the independent ARDs.

The ARD may include a frame, shaft, spring, frame cap, locking mechanism, elbow, collision attachment, and a system controller. The frame (e.g., housing) that may be secured to the undercarriage of the vehicle and may have a hollow conduit (e.g., tube) having a distal end (e.g., bottom of conduit) and a proximal end (e.g., opening of conduit) with helical rifling provided therebetween. The helical rifling may have a rotational path starting at 0° near the distal end and ending at the proximal end in range between 90° and 120° with respect to the path starting point. The helical rifling may be provided as a slot of material removed from the hollow conduits interior surface. The slot geometry may have a substantially semi-circular cross-section. There may be a plurality of slots equidistantly distributed around the conduits interior surface. At the distal end of the conduit, a spring may be positioned to interface with a distal end of the shaft (e.g., deployable shaft). The shaft includes a distal and proximal end having a plurality of followers axially distributed therebetween and a shaft lock receiver positioned near to the proximal end. The shaft may have a diameter complementary to the diameter of the conduit. The followers (e.g., guides) may mate with the helical rifling slots and are operable to engage with the slot path slidably. The proximal end of the shaft may have threading operable to secure the elbow. The elbow may have an angle of about 90° with a collision attachment secured to the opposite end of the collision attachment. The frame proximal end may further include a flange with a plurality of holes to align bolts to receive a frame cap (e.g., housing cap) with threading operable to receive said bolts. The frame cap may have a passage complementary to the diameter of the conduit to allow the shaft to advance through, and provides a bump stops that interfere with the helical rifling slots and is operable to prevent the advancement of the shaft when the followers collide with the bump stops. The frame cap may have a locking mechanism (e.g., solenoid) that is operable to secure the shaft in a locked position. When the ARD is assembled, the shaft is spring-loaded. The conduit and shaft mating surface may have lubrication to reduce heat and friction from advancement to the deployed position. The lubrication may also penetrate between the follower and the rifling slots. The shaft may have a hollow interior to reduce the system's overall weight. There may be a gasket between the frame and frame cap for providing an airtight seal between the mating surfaces.

The plurality of followers may have a spherical geometry having a diameter complementary to the width or diameter. There may be a plurality of followers positioned at different locations along the shaft in some embodiments. In such embodiments, a first follower group may be positioned, for example, at the center between the shaft distal and proximal end, and a second group may be positioned one-fourth the distance away from the distal end. The first and second groups have a different axially orientation to align with the path of the helical rifling slots. In another embodiment, the plurality of followers may be a tab having a length spanning from the starting point of the helical slots up to about the center of the shaft. In still another embodiment, the plurality of followers may be a ball bearing. In such embodiments, a spherical portion of material complementary to the ball bearing diameter is removed from the shaft exterior surface to receive the ball bearing.

In some embodiments, a motor vehicle may be equipped with four independent ARDs a forward left, a forward right, a rear left and a rear right, all independently actuated by the system controller. When the control system determines that a rollover will occur, the controller may determine the direction of rollover and may provide a signal to the ARD corresponding to the direction of rollover. For example, if the vehicle is tipping over to the left, the system may simultaneously deploy both the forward left and rear left ARDs. If the vehicle is rolling over to the left and has a forward pitch, the system may deploy the forward left ARD. When the ARD is deployed, the locking mechanism may be disengaged from the shaft lock, and compression spring load is released, thereby advancing the shaft through the conduit of the frame and the cap passageway. When the shaft advances through the conduit, the shaft rotates and translates at a rate defined by the path of helical rifling slots. When the shaft is deployed, the collision attachment is substantially perpendicular to vehicle chassis and may impact the road to counter vehicle rotation.

In some embodiments, a motor vehicle may ARD may have a small explosive charge in lieu of the compression spring. In such embodiments, the ARD frame and shaft mating surface may have a high tolerance (e.g., +/−0.001 inches) to provide a tight seal, and may have lubrication between the slots and the shaft followers to prevent overheating. Furthermore, when the ARD is deployed, the system controller may simultaneously disengage the locking mechanism and ignite the explosive charge, advancing the shaft through the conduit on a rotational and translational path provided by the followers rifling slots.

Accordingly it is one aspect of the present invention to provide, an anti-rollover device (ARD) may be mounted to a motor vehicle chassis, the ARD comprising: a frame fixedly mounted to an undercarriage a vehicle chassis, the frame comprising a tube having a bumps stops on a proximal end, a compression spring secured to a distal end, and a plurality of rifling slots thereon a tubes interior surface; a deployable shaft may be equipped with a plurality of followers axially distributed around an exterior surface between a distal and proximal end of the shaft, and a shaft lock receiver, where the distal end may interface with the compression spring; an elbow with a first end securing a collision attachment and a second end fixedly secured to the proximal end of the deployable shaft; a locking mechanism that may include a solenoid positioned at said tubes proximal end being operable to secure and release the deployable shaft from a locked position to an actuated position; and a controller having a processor, a readable and writeable controller memory, wherein the controller may be further in communication with a gyroscopic sensor, a vehicle computer, and the locking mechanism of the ARD. Wherein the controller processor may be operable to determine a rollover potential of the motor vehicle and may deploy the locking mechanism solenoid to an unlocked position thereby releasing the deployable shaft from the frame such that the compression spring advances the deployable shaft to the actuated position and positions the collision attachment to impact the ground and stabilize the vehicle when the rollover potential matches a predetermine roll rate in the controller memory. The frame may be fixedly mounted to an undercarriage of the motor vehicle chassis such that a frame's central axis is perpendicular to a centerline of the vehicle. The plurality of followers may be positioned at various locations along a length of the deployable shaft where a first set of followers helically align with a second set of followers. The followers align with the tube rifling slots such that the followers may travel along a predetermined rotational path of the tube rifling slots and collide with the frame bump stops thus seizing rotation when the deployable shaft is configured to the actuated position. The rifling slots may be distributed along the length of the tube and may have a revolution of 120 degrees. The elbow and deployable shaft may have a substantially circular and hollow cross-sectional area, and the collision attachment may be a hollow metal sphere that may be operable to deform when impacting the ground. The compression spring may provide a constant force to the deployable shaft and may be operable to advance the deployable shaft when the solenoid is disengaged.

It is further an aspect of the present invention to provide, an anti-rollover device controller processor that may be operable to use the gyroscopic sensor data and vehicle computer data to determine an attitude of the vehicle for determining a roll direction and for determining when said rollover potential matches a predetermined roll rate. The gyroscopic sensor data may include the roll, pitch and yaw of a vehicle measured at constant time intervals and may be stored in the controller memory for comparison with said vehicle computer data. The vehicle computer data may include a vehicle's center of gravity, a vehicle velocity, an accelerator pedal position, a steering wheel position, and a wheel angle position to the controller to when the roll direction is determined. The ARD may be further comprising a pair of independent right side and left side anti-rollover devices each having an independent front and rear ARD, wherein each of the ARDs are independently in communication with the controller. The controller processor may be further operable to determine which of the independent ARDs to deploy for mitigating rollover, where mitigating rollover may be determined by selecting the independent ARD that counteracts the roll direction. Alternatively, the controller processor may be further operable to determine a sequence for deploying a plurality of independent anti-rollover devices for mitigating rollover, where mitigating rollover counteracts the roll direction and the sequence for deploying a plurality of independent ARDs may be operable to counteract the roll rate and roll direction.

It is a final aspect of the present invention to provide, an anti-rollover system mounted to a motor vehicle chassis, the anti-rollover system comprising, a pair of independent right side ARDs, a pair of independent left side ARDs each having a front and rear ARD, where each of the ARDs comprising a tubular frame having bump stops and a locking mechanism on a proximal end, a compression spring positioned on a distal end, and a plurality of rifling slots thereon an interior surface; and a deployable shaft having a plurality of followers distributed axially around an exterior surface between a proximal and distal end and may be operable to align with the tubular frame rifling slots, where the proximal end secures an elbow having a collision attachment, and a distal end interfacing with the compression spring; and a controller having a processor, a readable and writable memory, and being in communication with each of the ARDs, further in communication with a plurality of gyroscopic sensors, and a vehicle computer, wherein the controller is operable to determine an attitude of a motor vehicle and independently deploy one or more of the right and left pair of ARDs.

Wherein the controller may be operable to mitigate rollover by activating at least one of the ARDs such that the locking mechanism may be disengaged from a locked position to an unlocked position thereby allowing the compression spring to advance the deployable shaft and position the collision attachment with a vehicle's drive surface such that the collision attachment impacts the ground and counters vehicle rollover. The ARD system may be further include determining a roll direction of the vehicle on the control processor using data provided by the plurality of gyroscopic sensors and the vehicle computer data, where the direction of roll may be a to the right or left forward or backward or a combination thereof. The vehicle computer data may include a vehicle velocity, an accelerator pedal position, a brake pedal position, a steering wheel position, and the wheel angle positions of the front steerable wheels. The gyroscopic sensors data may include the roll, pitch, and yaw of the vehicle with respect to the vehicles center of gravity. The plurality of gyroscopic sensors may be provided at various location on said vehicle, and are operable to provide the roll, pitch, and yaw of the vehicle at any given time to the controller. The ARD system may be further include determining a deployment sequence of the independent ARDs to mitigate vehicle rollover by calculating a roll rate based of the roll direction and a vehicle attitude and comparing the roll rate to a roll threshold in the controller memory. The deployment sequence may be operable to determine a timed disengagement for each of the independent ARDs locking mechanisms.

The present invention provides an anti-rollover device and system that is operable to mitigate a vehicle rollover and counter the direction and speed of a vehicles potential to rollover. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

It is an object of the present invention to provide a system that is capable of determining the likelihood of a vehicle rollover and deploying an anti-rollover device that is operable to counter the rollover thereby mitigating vehicle collision.

It is another object of the present invention to provide a device that is operable to mitigate rollover in a vehicle having a low center of gravity.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION OF THE DRAWINGS

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

Figure 1:
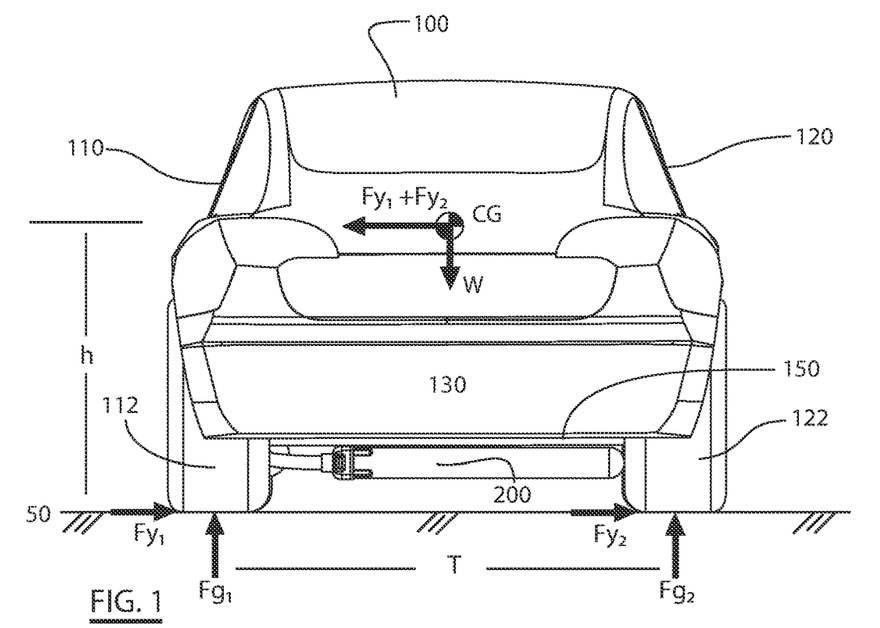
FIG. 1 shows the rear end of a stabilized motor vehicle equipped with the anti-rollover device, according to an embodiment of the present invention.

FIG. 1-3B illustrates an exemplary vehicle 100 having a left side 110, a right side 120, a rear end 130, a front end 140, and an undercarriage 150; the front of the vehicle may be represented by the directional vector "F". The undercarriage 150 may be fitted with an anti-rollover device 200 positioned between a front set of wheels 111, 121 and a rear set of wheels 112, 122. The anti-rollover device 200 may be in communication with a control system 300. Vehicle 100 may have an exemplary center of gravity CG which may be used by the control system 300 to define a centroid for yaw, roll, and pitch of a vehicle. FIG. 1 illustrates a free body diagram of the motor vehicle 100 while initiating a right-hand turn for vehicle 120. When cornering, the vehicle may be subject to various forces, including the frictional forces $Fy_1$, $Fy_2$ and normal forces $Fg_1$, $Fy_2$ on the left tire 112 and the right tire 122, a vehicle weight W positioned at the center of gravity CG, a centrifugal force or moment $Fy_1 + Fy_2$ of the vehicle about the center of gravity CG in a direction opposite to the frictional forces of the wheels $Fy_1$, $Fy_2$, the center of gravity may be positioned at a height "h" from the contact point of the tires with the road, and the track width "T" between the left tire 112 and the right tire 122. The vehicle rollover potential may also include the kinematic properties of the suspension. The kinetic forces may be stored in the system memory 320.

Figure 3A:
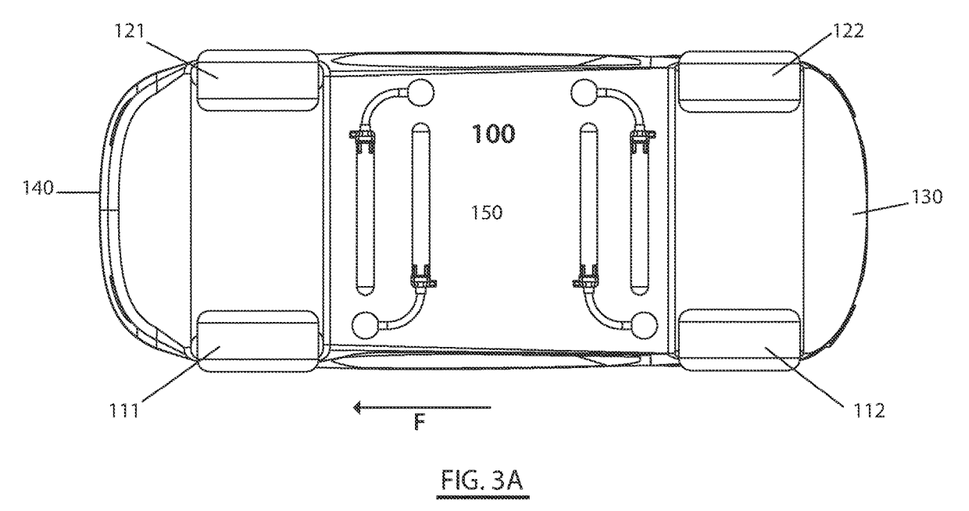
FIG. 3A shows the undercarriage of a motor vehicle equipped with a plurality of anti-rollover device in the locked position, according to an embodiment of the present invention.
Figure 3B:
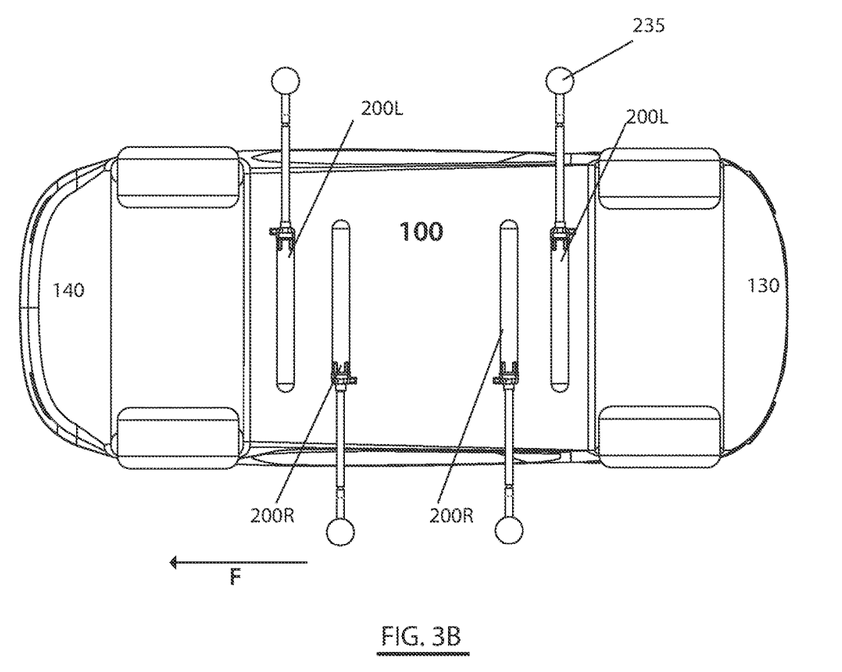
FIG. 3B shows the undercarriage of a motor vehicle equipped with a plurality of anti-rollover device in the deployed position, according to an embodiment of the present invention.

There may be a plurality of anti-rollover devices 200 fixed to the undercarriage 150 of the vehicle 100, a right pair 200R, and a left pair 200L, (see FIGS. 3A-3B). The right pair of anti-rollover devices 200R may be operable to deploy if the vehicle begins to roll the right, and inversely the left pair 200L may be operable to deploy if the vehicle begins to roll to the left. In some situations where a vehicle 100 is experiencing a combination of yaw, roll, and pitch about the center of gravity CG, the control system 300 may deploy a single anti-rollover device 200 to stabilize the vehicle 100. The respective pair of anti-rollover devices 200R, 200L in the system are of a similar construction, and thus only one anti-rollover device 200 will be described in detail.

Figure 4:
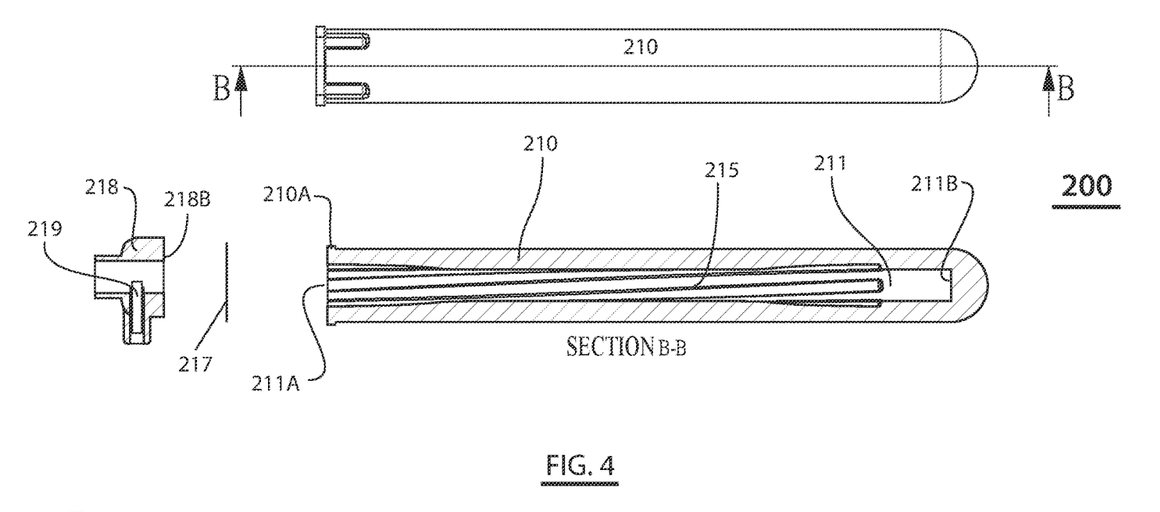
FIG. 4 shows a cross-sectional view of an anti-rollover device housing, according to an embodiment of the present invention.
Figure 5:
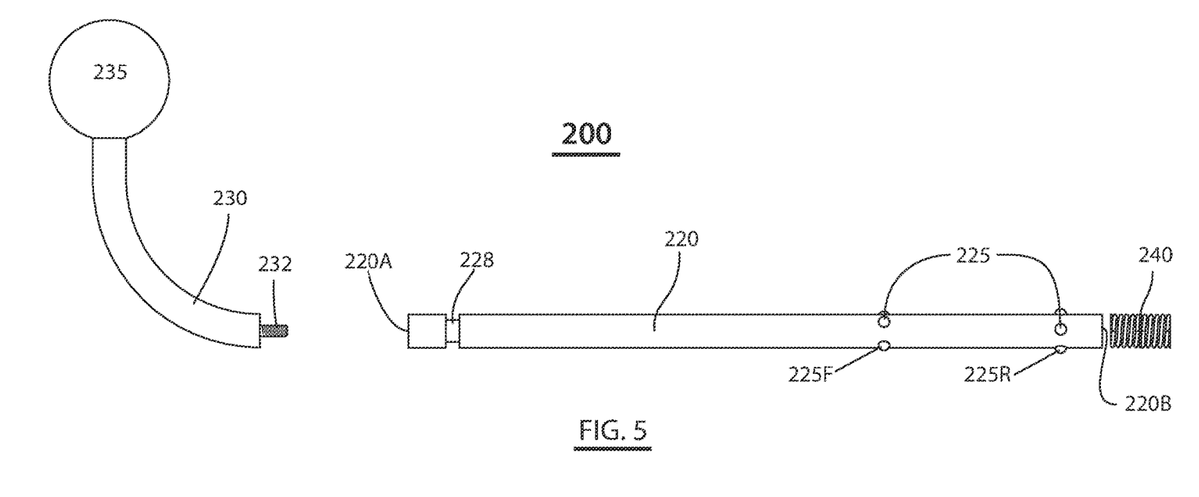
FIG. 5 shows an exploded view of the deployment shaft, impact elbow, and collision attachment of an anti-rollover device, according to an embodiment of the present invention.
Figure 6:
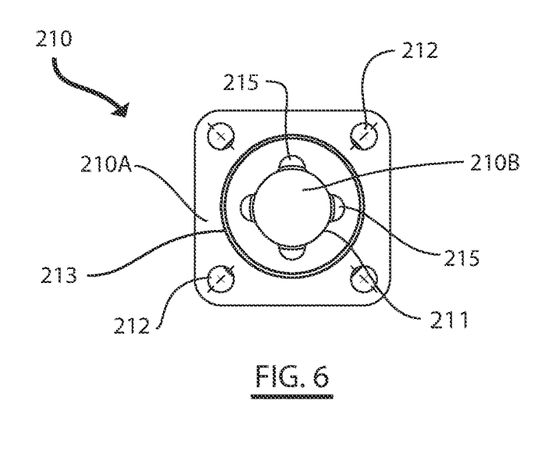
FIG. 6 shows a side view of the anti-rollover device housing, according to an embodiment of the present invention.
Figure 7:
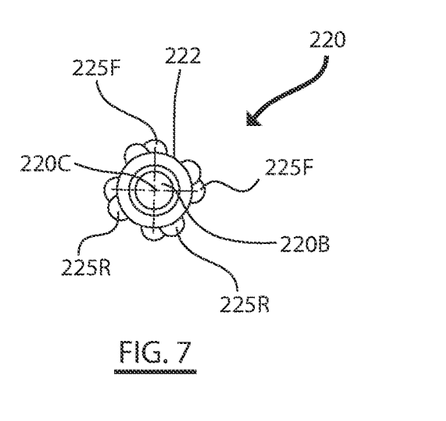
FIG. 7 shows a side view of a deployment shaft of the anti-rollover device, according to an embodiment of the present invention.
Figure 8:
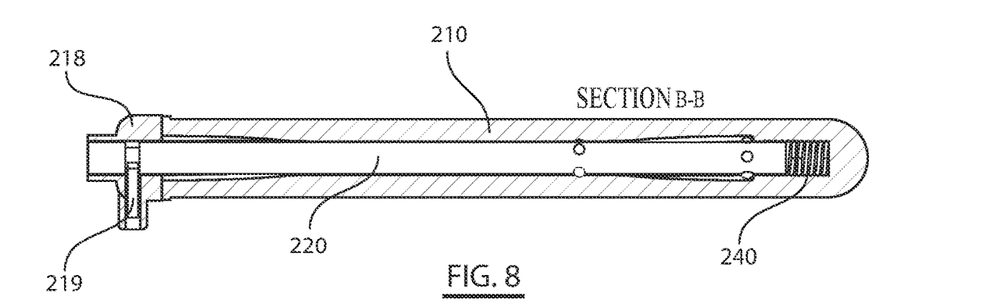
FIG. 8 shows a cross-sectional view of the housing assembled with the deployment shaft of FIG. 5 of the anti-rollover device, according to an embodiment of the present invention.

FIG. 4-9 illustrates an embodiment of an exemplary anti-rollover device 200 of the present invention, the anti-rollover device may include a housing 210, a deployment shaft 220, an impact elbow 230, a collision attachment 235, a housing cap 218, a spring 240, and a locking mechanism 200. As seen in FIG. 4 a cross-sectional of the housing 210 taken about the line B-B shows a barrel 211 with rifling slots 215 on the interior surface. The barrel may have a proximal end 211A and a distal end 211B. The housing 200 may have a flange 210A with a plurality of bolting holes 212 positioned around the centerline of the housing. A housing cap 218 may include a sealing surface 218B, a locking mechanism 219, and a plurality of threaded holes complementary to the bolting holes 212 of the housing flange 210A. The threaded holes are operable to receive a plurality of bolts and secure the housing caps sealing surface 218 to the flange 210A. A gasket 217 providing a watertight seal may be positioned between the flange 210A and the sealing a surface 218B interface. The barrel's interior surface 211 may have a diameter operable to receive a deployment shaft 220, and the locking mechanism 219 may be operable to secure the shaft in a locked position. The locking mechanism 219 may be an electronic solenoid, hydraulic piston, spring-loaded latch, pawl, and ratchet, or other related devices. FIG. 6 shows a flange side view of the housing and four rifling slots 215 equidistantly positioned around the centroid of the interior surface 211. The flange 210A may also include a gasket seal receiver 213.

FIG. 5 illustrates the deployment shaft 220, which includes a proximal end 220A, a distal end 220B, a shaft lock receiver 228, and a plurality of followers 225 distributed equidistantly about a centerline 220C of the shaft. The deployment shaft 200 diameter may range from 1 inch to 2½ inches. The followers may be skewed towards the distal end 220B of the shaft, and may include a plurality of different follower sets, a forward set 225F and a rear set 225R are illustrate, but the deployment shaft may include more sets of followers. FIG. 6 shows the distal end 220B of the deployment shaft 220. This view illustrates that the rear follower set 225R is offset from the forward set of followers 225F, they are offset to continuously align the shaft with the rifling slots 215 of the housing 210. The distal end 220B may have a small recess 220B operable to receive the spring 240. Returning to FIG. 5, the deployment shaft 220 may have threading on the proximal end 220A operable to receive the threading 232 of an impact elbow 230. The impact elbow 230 may position a collision attachment 235 perpendiculars to the deployment shaft 220. The deployment shaft distal end 220B may be operable to secure a spring 240 and compress the spring between the deployment shaft 220 and the barrel's distal end 211B during assembly of the anti-rollover device 200. The collision attachment 235 may have a substantially spherical geometry and may have a hollow construction that is operable to deflect and absorb the energy from a vehicle roll over.

In some embodiments, the follower set 225 may be a set of ball bearings that are operable to aid in the translation of the deployments shaft and reduce friction. In such embodiments, a plurality of circular channels may be manufactured by removing a portion of material from the exterior surface 222 of the deployments shaft 220 that is operable to receive a spherical ball bearing. The plurality of circular channels may be complementary to the follower set 225 and may be equidistantly positioned around the centerline of the deployment shaft 220. The circular channels in some embodiments may be a slot operable to provide less friction.

Figure 9:
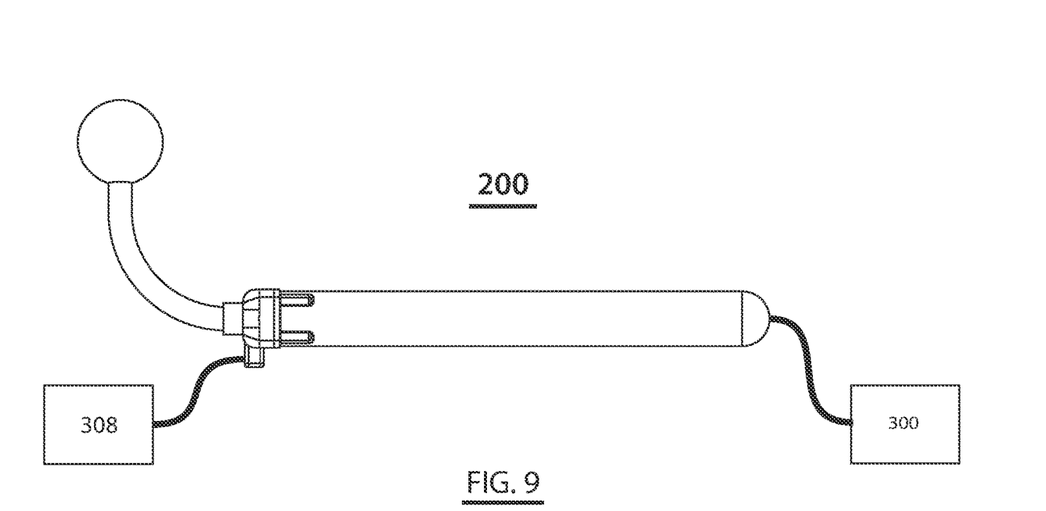
FIG. 9 shows an exemplary anti-rollover device, according to an embodiment of the present invention.

The anti-rollover device 200 may be assembled by first inserting the spring 240 into the barrels distal end 211B, then inserting the deployment shaft 220 into the barrel 211 while aligning the follower sets 225 with the rifling slots. The housing cap 218 may then be fashioned over the deployment shaft 220 and the locking mechanism 219 may be secured to the locking receiver 228 and fixed in the locked position. The housing cap 218 and the deployment shaft 220 may have a pressure applied on the proximal end 220A to overcome the force of the spring 240, while the housing cap 218 is bolted to the housing flange 210A. The housing 210, housing cap 218, spring 240, and deployment shaft 220 are shown in the assembled configuration in FIG. 8. The impact elbow 230 and collision attachment 235 may then be secured to the deployment shaft and fixed into position. The anti-rollover device 200 assembled and in the locked position may then be fashioned to the undercarriage of a vehicle 150 and attached with either a bracket, a strap or may be bolted to the undercarriage 150. In some embodiments, the anti-rollover device 200 is integrated into the vehicle chassis. Once the device 200 is secured to the vehicle 100 the control system 300 may be connected to the various sensors and systems as shown in FIG. 9.

Figure 2:
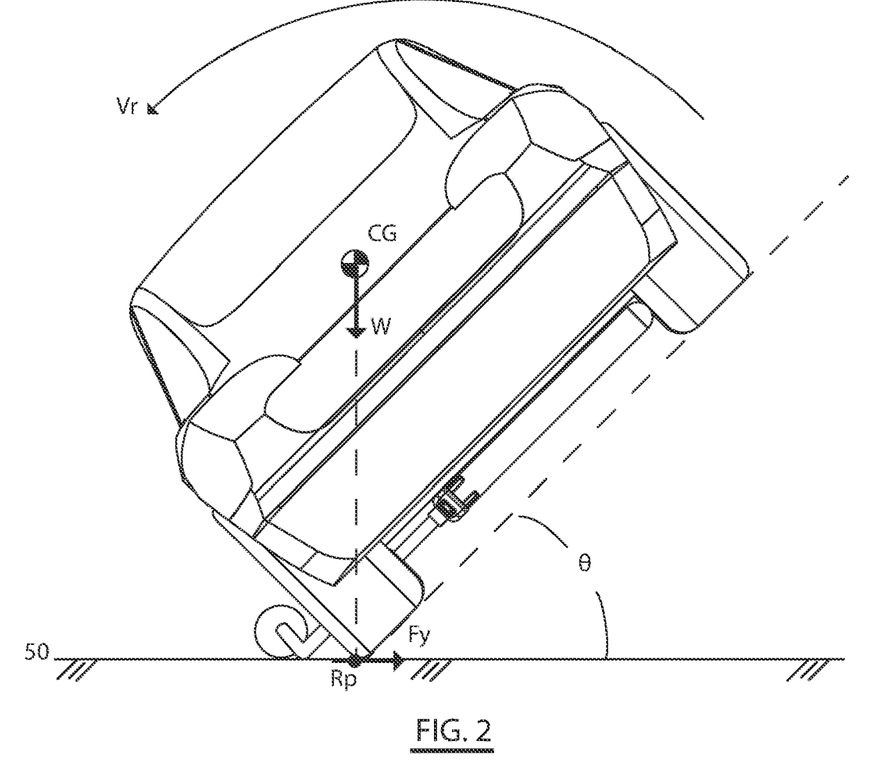
FIG. 2. shows the rear end of a motor vehicle equipped with the anti-rollover device, the motor vehicle experiencing rollover, according to an embodiment of the present invention.
Figure 11:
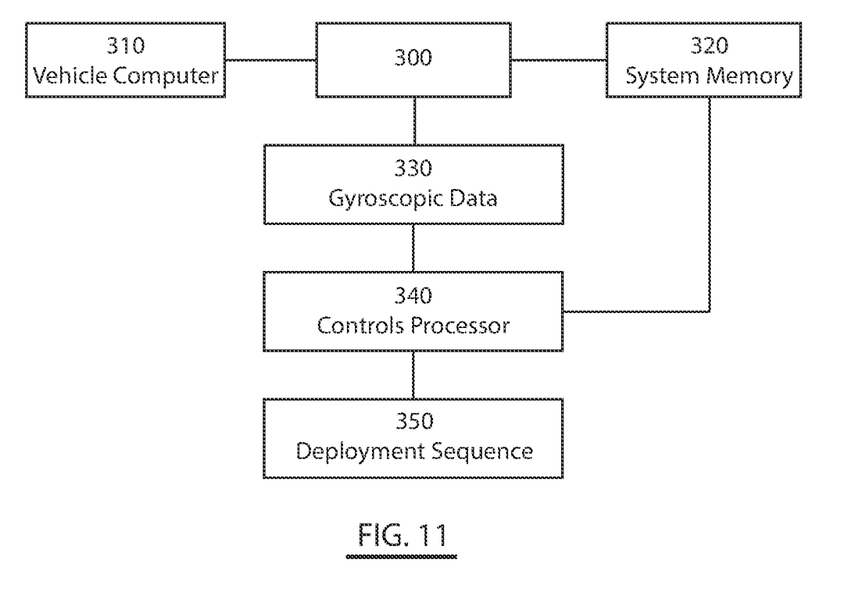
FIG. 11 shows a simplified controls schematic for controlling the anti-rollover device, according to an embodiment of the present invention.

FIG. 2 illustrates the vehicle 100 about to roll over onto the left side 110 along the rotational vector "Vr" where the rotation is about the left wheels 111, 112 at the rotation point "Rp." FIG. 11 shows a block diagram of the control system 300. The control system 300 is operable to retrieve vehicle computer data 310 and communicate the data to the controls processor 340. The vehicle computer data may include, for example, but not limited to, the vehicle velocity, accelerator pedal position, steering wheel position, wheel angle position, and if equipped with a graphical position system, may provide the vehicle's geographic position. The control system 300 may also communicate gyroscopic 330 data to the controls processor 340. The gyroscopic sensor 330 may include a plurality of different gyroscopic sensors positioned at various locations on the vehicle body. The controls processor 340 being operable to perform calculations to determine the vehicle rollover risk and compare the result with the system memory 320. If the controls processor 340 determines a vehicle will roll over the deployment sequence 350 is initiated and the anti-rollover device 200 will be deployed. The controls processor 300 retrieves the gyroscopic angle θ and the vehicle data to determine a value corresponding to the roll rate of the vehicle 100. The roll rate value may be compared to tabulated data in the control system memory 320, and the likelihood of a vehicle tip over is determined. When the deployment sequence is initiated, the control system may initiate a braking sequence and select an anti-rollover device 200 that is most likely to mitigate rollover. In some embodiments, the system memory 320 may include tire data (e.g., life of tire, tire pressure, time since last rotation, etc.) for predicting a coefficient of friction for the tires, the wheel track width, and the center of gravity location, for calculations of the centripetal forces.

Figure 10A:
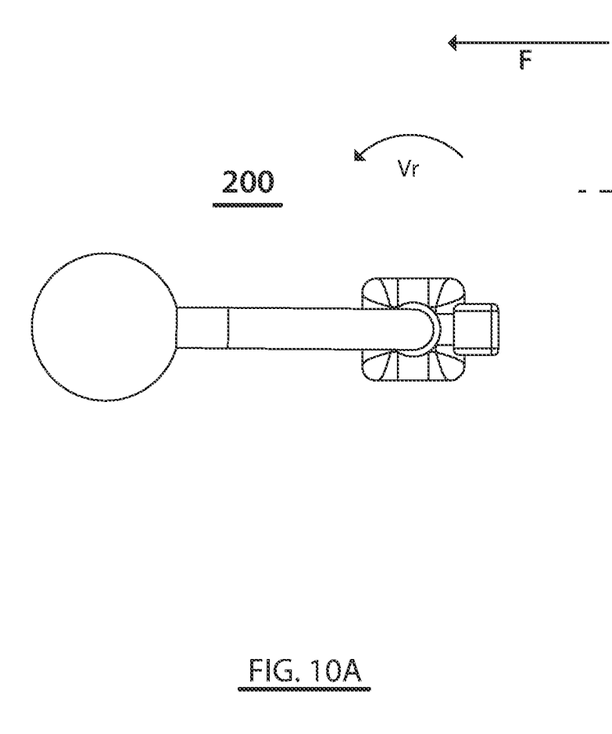
FIG. 10A shows an exemplary anti-rollover device in the locked position according to an embodiment of the present invention.
Figure 10B:
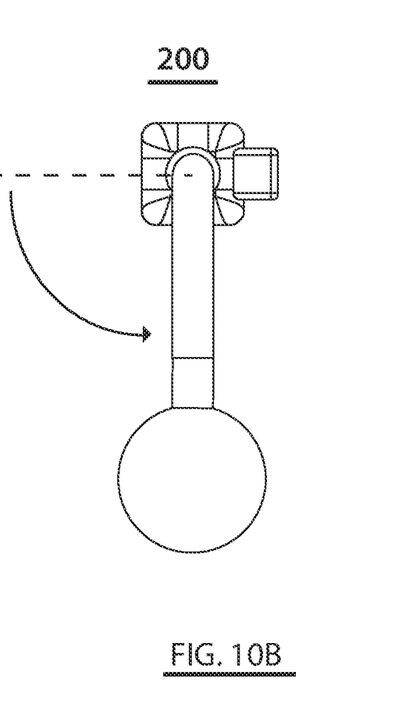
FIG. 10B shows an exemplary anti-rollover device in the deployed position, according to an embodiment of the present invention.

When the anti-rollover device 200 is deployed, the locking mechanism 219 is first disengaged, and the spring 240 provides pressure to the distal end of the deployment shaft 220B and forces the deployment shaft 200 to advance through the barrel 211. FIG. 10A shows the device 200 in the locked position and FIG. 10B shows the device in the deployed position. The rifling slots 215 may have a pitch operable to rotate the deployment shaft 200 about 90° about the centerline of the housing 210. In most instances, the deployment shaft may not complete a full 90° rotation but may position the collision attachment 235 to impact the driving surface 50, thereby absorbing impact forces and deflecting the vehicle 100 back onto the wheels.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An anti-rollover device mounted to a motor vehicle chassis, the anti-rollover device comprising:

a. a frame fixedly mounted to an undercarriage of a vehicle chassis, the frame comprising a tube having a bump stop on a proximal end, a compression spring secured to a distal end, and a plurality of rifling slots in an interior surface of said tube;
   b. a deployable shaft equipped with a plurality of followers axially distributed around an exterior surface between a distal and a proximal end of said shaft each of which follows one of said plurality of riflings in said tube when said deployable shaft moves through said tube, wherein said distal end interfaces with said compression spring, and a shaft lock receiver, wherein said plurality of followers are positioned at various locations along a length of said deployable shaft wherein a first set of followers helically align with a second set of followers;
   c. an elbow with a first end securing a collision attachment and a second end fixedly secured to said deployable shaft proximal end;
   d. a locking mechanism including a solenoid positioned at said tubes proximal end and being operable to secure and release said deployable shaft from a locked position to an actuated position; and
   e. a controller having a processor, a readable and writeable controller memory, wherein said controller is further in communication with a gyroscopic sensor, a vehicle computer, and said locking mechanism.

2. The anti-rollover device of claim 1, wherein said controller processor is operable to determine a rollover potential of said motor vehicle and configures said locking mechanism solenoid to an unlocked position thereby releasing said deployable shaft from said frame such that said compression spring advances said deployable shaft to said actuated position and positions said collision attachment to impact the ground and stabilize the vehicle when said rollover potential matches a predetermined roll rate in said controller memory.

3. The anti-rollover device of claim 1, wherein said frame is fixedly mounted to an undercarriage of said motor vehicle chassis such that a frames central axis is perpendicular to a centerline of said vehicle.

4. The anti-rollover device of claim 1, wherein said followers travel along a predetermined rotation path of said tube riflings and collide with said frame bump stops thus seizing rotation when said deployable shaft is configured to said actuated position.

5. The anti-rollover device of claim 1, wherein said riflings are distributed along the length of the interior surface of said tube and has a revolution of 120 degrees.

6. The anti-rollover device of claim 1, wherein said elbow and deployable shaft have a substantially circular and hollow cross-sectional area.

7. The anti-rollover device of claim 1, wherein said collision attachment is a hollow metal sphere and is operable to deform when impacting the ground.

8. The anti-rollover device of claim 1, wherein said compression spring provides a constant force to said deployable shaft and is operable to advance deployable shaft when said solenoid is disengaged.

9. The anti-rollover device of claim 1, wherein said elbow positions said collision attachment at 90° with respect to the centerline of the said deployable shaft.

10. The anti-rollover device of claim 1, wherein said controller processor is further operable to use said gyroscopic sensor data and said vehicle computer data to determine an attitude of said vehicle for determining a roll direction and said determining when said rollover potential matches a predetermined roll rate.

11. The anti-rollover device of claim 10, wherein gyroscopic sensor data include the roll, pitch and yaw of a vehicle measured at constant time intervals and is stored in said controller memory for comparison with said vehicle computer data.

12. The anti-rollover device of claim 11, wherein said vehicle computer data includes a vehicle center of gravity, a vehicle velocity, an accelerator pedal position, a steering wheel position, and a wheel angle position to said controller for determining said roll direction.

13. The anti-rollover device of claim 12, further comprising a pair of independent right side and left side anti-rollover devices each having an independent front and rear anti-rollover device, wherein each of said independent anti-rollover devices are in communication with said controller.

14. The anti-rollover device of claim 13, wherein said controller processor is further operable to determine which of said independent anti-rollover devices to deployed for mitigating rollover, wherein said mitigating rollover is determined by selecting the independent anti-rollover device that counteracts the roll direction.

15. The anti-rollover device of claim 13, wherein said controller processor is further operable to determine a sequence for deploying a plurality of said independent anti-rollover devices for mitigating rollover, wherein said mitigating rollover counteracts said roll direction.

16. The anti-rollover device of claim 15, wherein said sequence for deploying a plurality of said independent anti-rollover devices is operable to counteract said roll rate and said roll direction.

* * * * *